(12) United States Patent
Nawrath

(10) Patent No.: US 6,972,103 B1
(45) Date of Patent: Dec. 6, 2005

(54) METHOD AND DEVICE FOR PRODUCING CONTINUOUS PLASTIC FILMS, WEBS AND SHEETS CAPABLE OF FORMING OPTICAL IMAGES

(75) Inventor: Peter Nawrath, Remscheid (DE)

(73) Assignee: Heinrich Friedrich Schröder, Hamburg (DE)

(*) Notice: Subject to any disclaimer, the term of this patent is extended or adjusted under 35 U.S.C. 154(b) by 129 days.

(21) Appl. No.: 10/088,003

(22) PCT Filed: Sep. 11, 2000

(86) PCT No.: PCT/DE00/03149

§ 371 (c)(1),
(2), (4) Date: Jul. 22, 2002

(87) PCT Pub. No.: WO01/19600

PCT Pub. Date: Mar. 22, 2001

(30) Foreign Application Priority Data

Sep. 11, 1999 (DE) .................................. 199 43 604

(51) Int. Cl.[7] .......................... B29C 47/78; B29C 47/88
(52) U.S. Cl. ............................. 264/210.5; 264/177.1; 264/211.12; 264/214
(58) Field of Search .......................... 264/175, 177.1, 264/210.5, 211.12, 214; 428/600

(56) References Cited

U.S. PATENT DOCUMENTS

| | | | | |
|---|---|---|---|---|
| 2,442,443 A | | 6/1948 | Swallow | |
| 4,612,074 A | * | 9/1986 | Smith et al. | ............... 156/85 |
| 4,744,936 A | * | 5/1988 | Bittner, Jr. | ................. 264/175 |
| 4,753,587 A | * | 6/1988 | Djordjevic et al. | ......... 425/140 |
| 4,764,101 A | * | 8/1988 | Capelle | .................... 425/133.5 |
| 4,874,571 A | * | 10/1989 | Muller | ....................... 264/175 |
| 5,122,212 A | * | 6/1992 | Ferguson et al. | ........... 156/209 |
| 5,234,729 A | * | 8/1993 | Wheatley et al. | ............. 428/30 |
| 5,310,918 A | | 5/1994 | Uchino et al. | |
| 5,656,209 A | * | 8/1997 | Benz et al. | .................. 264/1.6 |
| 5,674,442 A | * | 10/1997 | Morita | .................... 264/178 R |
| 5,833,792 A | * | 11/1998 | Funaki et al. | .......... 156/244.27 |
| 6,129,652 A | * | 10/2000 | Wenzel et al. | ................ 492/46 |
| 6,296,731 B1 | * | 10/2001 | Fujii et al. | ................... 156/209 |
| 6,663,807 B2 | * | 12/2003 | Klug | .......................... 264/105 |
| 2002/0018908 A1 | * | 2/2002 | Smith et al. | ................ 428/600 |
| 2003/0087573 A1 | * | 5/2003 | Erdos et al. | ................ 442/327 |

FOREIGN PATENT DOCUMENTS

| | | |
|---|---|---|
| DE | 41 10 248 | 10/1992 |
| EP | 0 799 686 | 10/1997 |

* cited by examiner

Primary Examiner—Michael P. Colaianni
Assistant Examiner—Monica A. Fontaine
(74) Attorney, Agent, or Firm—Gudrun E. Huckett

(57) ABSTRACT

In a method and a device for continuously manufacturing films, webs, and sheets of plastics capable of forming optical images a melted plastic mass, pre-shaped as a sheet, is guided into a roller gap of a calender, the roller gap formed between a shaping engraving cylinder roller and a smoothing strip surrounding partially the shaping engraving cylinder roller. The shaping engraving surface of the cylinder roller is heated to melting temperature in the roller gap, wherein the melted plastic mass is applied directly onto the shaping engraving surface of the heated cylinder roller. A profiling is provided by cooling the melted plastic mass in the roller gap by heat removal on a side facing the shaping engraving surface.

13 Claims, 6 Drawing Sheets

Figure 1:
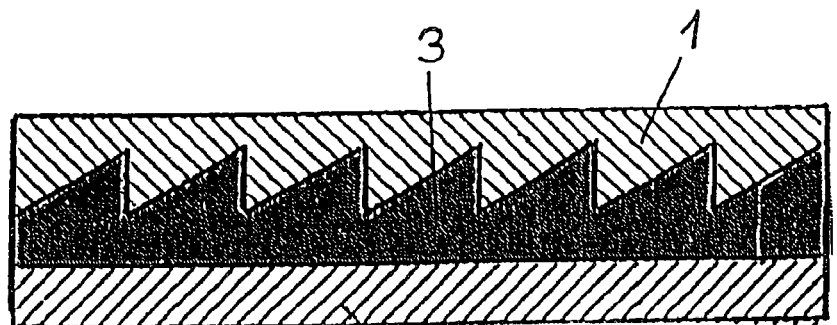

METHOD AND DEVICE FOR PRODUCING CONTINUOUS PLASTIC FILMS, WEBS AND SHEETS CAPABLE OF FORMING OPTICAL IMAGES

The invention relates to a method for the continuous production of films, webs and sheets capable of forming optical images according to the preamble of the independent claim and devices for performing the method.

Plastic products which are capable of forming optical images, such as lenses of all kinds, including totally reflecting, transparent prism sheets and retroreflectors of transparent plastic, in particular, of PMMA, are produced primarily discontinuously by extrusion or a pressing method, aside from a film casting process. The field of application of the corresponding products is limited by the parameters of the manufacturing method and devices therefor. The requirements of the market, in particular, in the area of light guiding technology and solar technology are directed to sheet products of large surface areas in dimensions which are available, for example, in the case of plate glass. Fulfilling these requirements is the purpose of this invention.

The technically possible manufacture of sheet products of large surface areas via a casting method, for example, from low viscosity solutions, for example, (PMMA), is economically insignificant aside from the film casting which is not useable, or useable only to a limited extent, for the aforementioned market. The possibility of extruding endless flat profiles capable of forming optical images is provided for coarse dimensions and cross-sections of the product, but their optical quality is suitable only for use in connection with diffusors for illumination purposes. This characteristic is also true for endless products produced according to U.S. Pat. No. 5,656,209 which has a linear prism-textured surface whose edges and surfaces are as indistinct and distorted as in the prism-profiled extruded products.

By means of cold-pressing or hot-pressing rolling methods, sharp-edged imprints can be performed only in connection with kneadable material. A sharp-edged profiling of a plastic film in a calender is not possible in the presence or absence of heat without inventive measure for physical reasons because the surface tension of a plastic film, soft in the heat, prevents even for the strongest pressing stages the filling of sharp-edged valleys of a correspondingly engraved shaping roller, aside from the fact that the low-viscosity melted mass pulled through the roller gap will creep back (contraction) out of the sharp edges behind the roller gap during the solidification process.

In the development of vulcanization of endless rubber strips in a calendering method, the object was to calibrate the raw rubber material in the roller gap to a strip and to perform the vulcanization process by heat whose effect depends on a time parameter. In this connection, the calibrated raw rubber strip while subjected to the vulcanization process, must be guided along with the heated roller of the calender, and this requirement was fulfilled by a steel strip surrounding the heated calender roller partially in that the raw rubber between the heated roller and the steel strip partially surrounding it could be vulcanized completely on the way to the calibrating roller gap up to the point of deflection of the steel band. It was an obvious measure to carry out the same method for an extruded plastic strip in order to produce in this way images true to shape of an engraved calender roller. In the patent literature, different suggestions for performing such a method are provided. In the patent document U.S. Pat. No. 2,442,443, a calender device employing two endless steel strips surrounding two calender rollers is described which are firstly provided for smoothing the plastic film to be produced. In the European patent document 0 799 686 A1 a method for the endless production of optical products and a device for performing this method are described; U.S. Pat. No. 4,486,363 describes this also. In these documents and in the method disclosed in the patent document DE 35 05 055 as well as in DE 41 10 284 A1, the use of an endless steel strip partially surrounding the forming roller is the primary reference point of the respective inventive concept. However, in the many application variants thereof the results remain unsatisfactory, in particular, the economic efficiency of the respective methods and devices for performing the same because simply by employing an endless steel strip alone, without an optimal economic temperature control of the components of the device for performing the known method, which components participate in the shaping of the product surface, no progress can be effected in the manufacture of films, webs, and plates of transparent plastics capable of forming optical images.

The optical quality of the products produced by the suggested methods and the devices for performing the same is generally unsatisfactory in the same respects as that of the extruded products as well as the optical quality of the products produced according to the method of U.S. Pat. No. 5,656,209. The sharpness of the outer edges of the prisms is usually round while the inner edges are sharp. In this connection, cooling systems and cooling devices of calender rollers, for example, according to patent documents DE 196 35 845 C1 as well as according to patent document DE 41 16 068 C2 have been taken into consideration, and it was found that they provide no teaching in regard to the solution of the object in question of the invention, i.e., to develop, inter alia, a shaping calender roller whose surface upon each revolution must pass through a temperature gradient without uneconomical energy use.

According to the prior art which is to be improved the object of the invention was to introduce a flowing melted plastic mass, pre-shaped as a flat product in an extruder or heating chamber, into the optical structures of a correspondingly engraved calender roller and to transfer the same into the solidification state, while exactly reproducing the engraving, such that a flat product is formed which can be removed continuously from the engraved calender roller.

The solution of the object in question of the invention was based first on the approach of the conventional method of manufacturing high-quality Fresnel lenses by a pressing method. In its development it was found that, for example, a cast or extruded PMMA sheet, heated to the melted state between a smooth plate and a Fresnel mold, would not result, even upon application of maximum pressure, in a reproduction with sharp edges of the deep-seated edges of the Fresnel mold. The surface of the pre-manufactured PMMA sheet has thus a property, obtained by its manufacturing process, which obstructs the material flow in the microrange because the use of PMMA powder instead of the pre-manufactured PMMA sheet in the presence of heat and pressure results in a total reproduction of the Fresnel mold and thus in a high-quality optical object. The teaching found in this process became part of the solution of the object in question of the invention, in particular, by means of the measure of introducing a low-viscosity melted mass, exiting from a wide slot nozzle of an extruder or exiting from a heating chamber, directly into the roller gap of the calender, i.e., between the shaping roller and the steel strip partially surrounding it.

The object is to prevent the reaction of the melted mass surface with air. Upon entry of the melted mass into the roller gap, a heat should be present therein which is the highest permissible heat for the plastic material, wherein the heat is reduced toward the exit of the surrounding stretch of the steel strip in a controlled way such that the melted mass introduced into the pointed valleys of the shaping roller reaches a hard-elastic state quicker than the smooth backside.

Upon exiting of the melted mass which has been solidified in a controlled fashion, a deflection of the solidified strip about an exit roller is permissible only to a degree permitted by the coefficient of elasticity of the solidified plastic. The difference between the diameter of the exit roller and the diameter of the external side of the plastic strip transported thereon must not surpass the coefficient of elasticity thereof. This means that from a certain material strength on bending of the strip or of the calendered sheet, after leaving the exit gap of the calender, is no longer permissible.

In the solution according to the invention for the object in question of the invention, four specific method steps are relevant. 1. An almost direct introduction of the melted mass from the extrusion nozzle into the roller gap or direct contacting of the melted mass with the engraving surface of the engraving sleeve mounted onto the roller cylinder and heated to the temperature of the melting temperature. 2. Providing the melting heat on all contact parts of the melted mass in the roller gap. 3. The control of the heat removal from the shaping roller different from that of the smooth strip side. 3. The adjustment of the bending angle of the finished product exiting from the roller gap to the strength and modulus of elasticity thereof.

The device for performing the four method steps according to the invention differs in the construction and in principle only little from the devices according to the prior art used for the same purpose. An advance and a novelty aspect is the measure of forming the roller which is surrounded by the shaping engraving sleeve (nonwoven) of a steel cylinder whose wall thickness is determined by the thermal capacity of its mass.

According to the invention, the engraving sleeve, before contact with the melted mass and in the area thereof, is heated to the melting temperature in order to transfer the heat after passage of the roller gap onto the steel cylinder of the calender roller. At the exit gap of the calender according to the invention, a pivotable smoothing and cooling table is provided with which the problem of the bending angle of the removed calendered material is counteracted.

The filling of the sharp-edged valleys in the engraving sleeve and the prevention of partial contraction of the melted plastic mass during the cooling process are the main criteria of the method according to the invention which in the device for performing the same is imparted with a purpose-fulfilling importance. In principle, with the inventive method and the device for performing the same, instead of the extruded melted mass, it is also possible to process a pre-manufactured plastic strip, brought to the melting temperature, to the inventively desired product.

The drawings show the method conditions and two embodiments of the device according to the invention for performing the method of continuous manufacture of endless films, webs and sheets of plastic capable of forming optical images.

Figure 2:
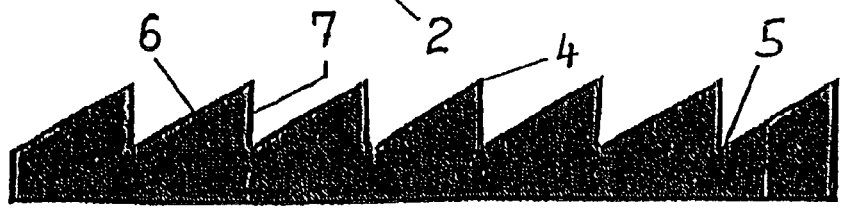
Figure 3:
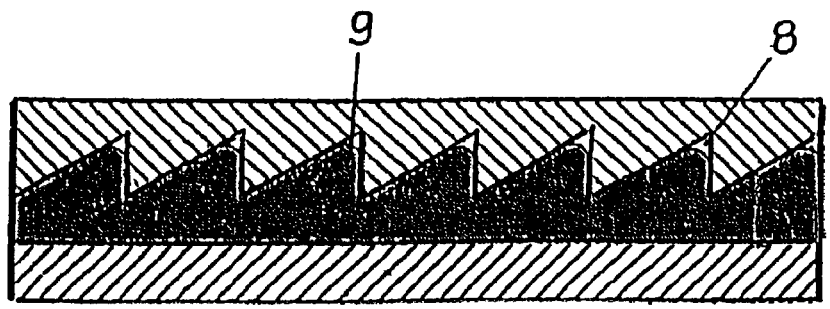
Figure 4:
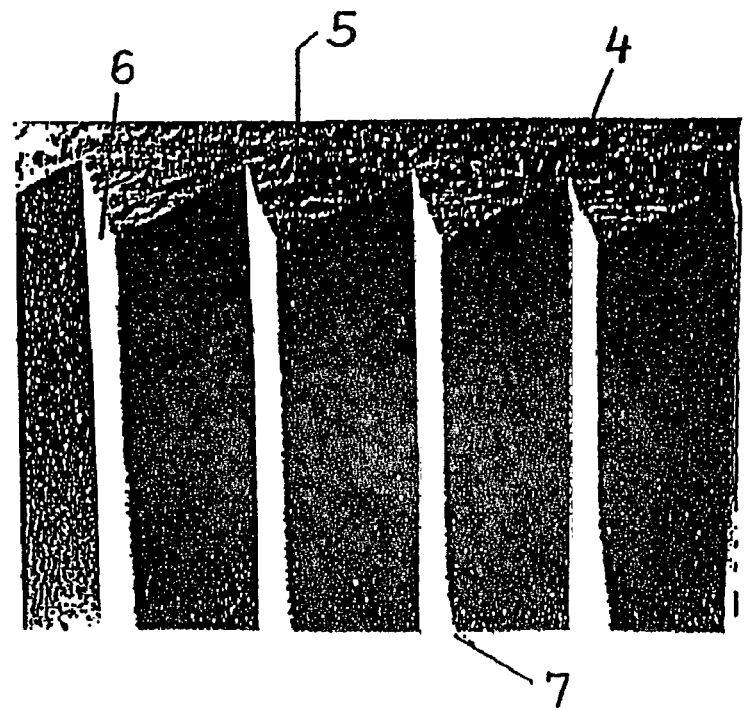
Figure 5:
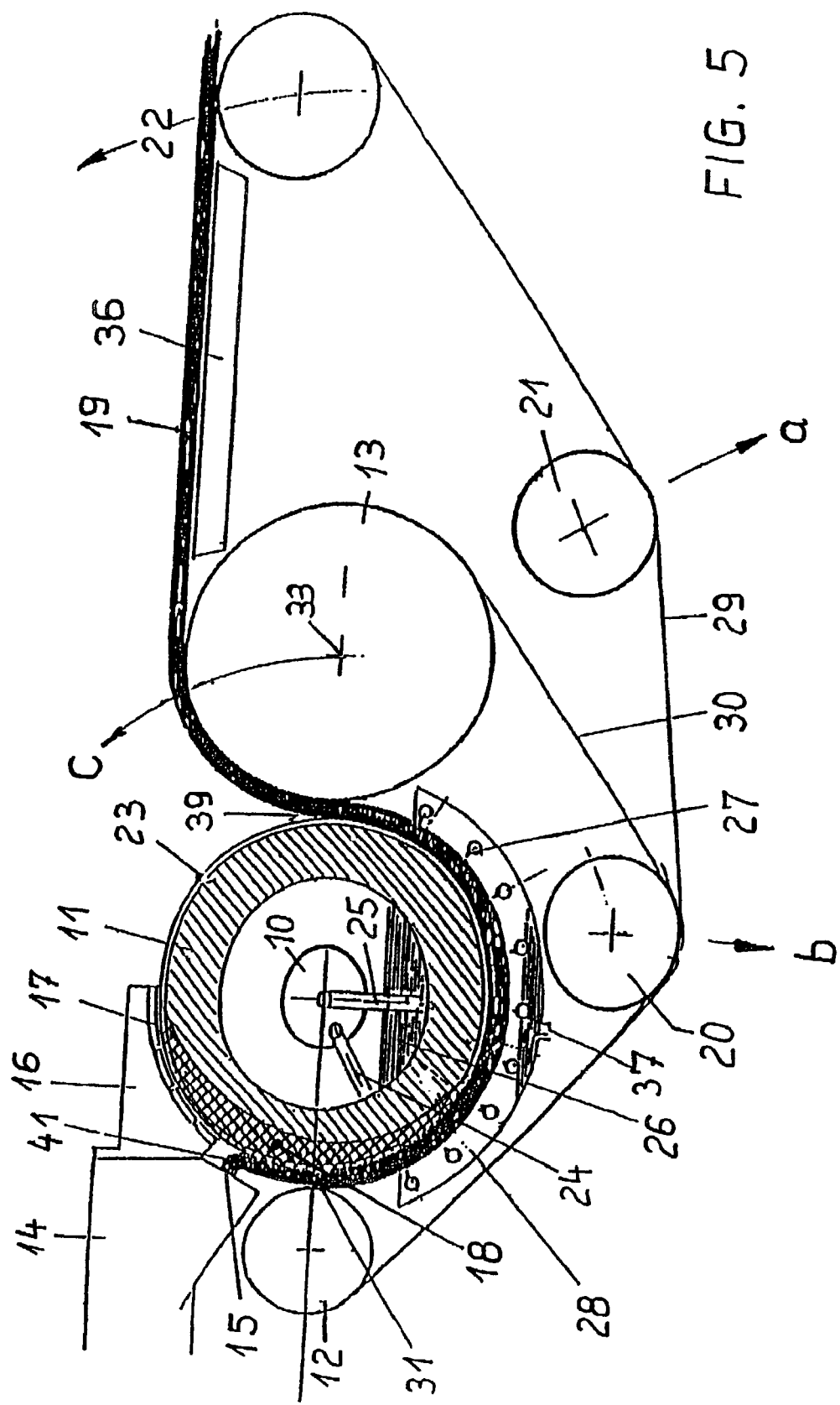
Figure 6:
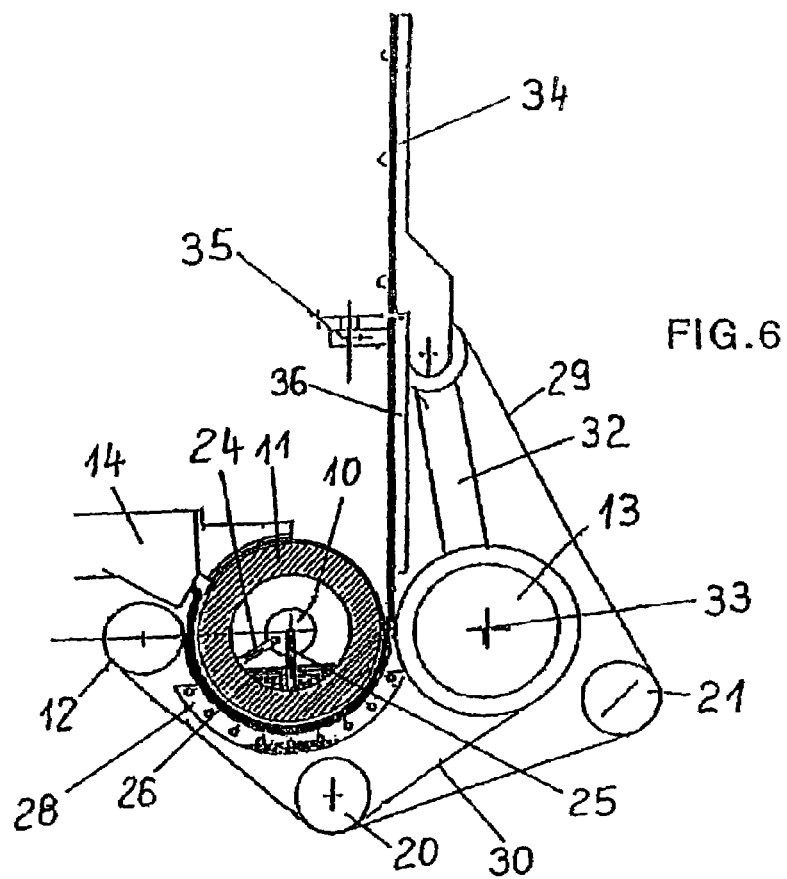
Figure 7:
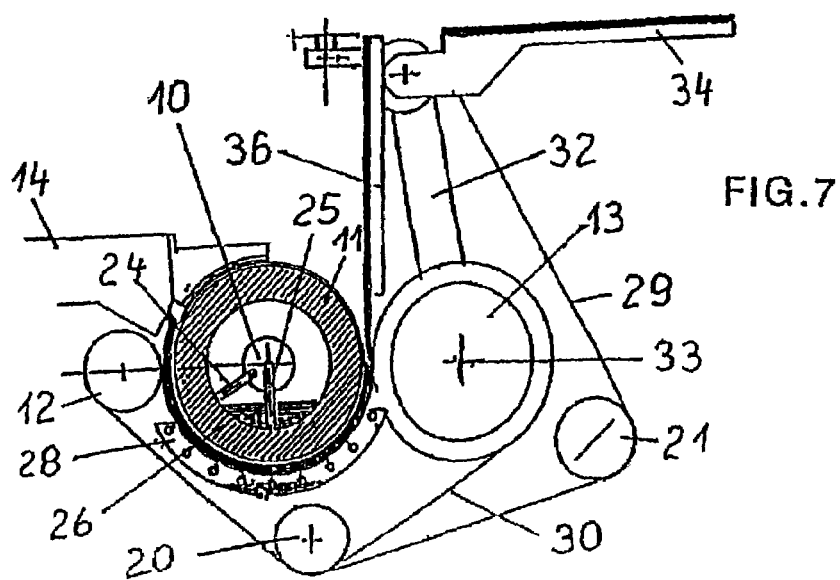
Figure 8:
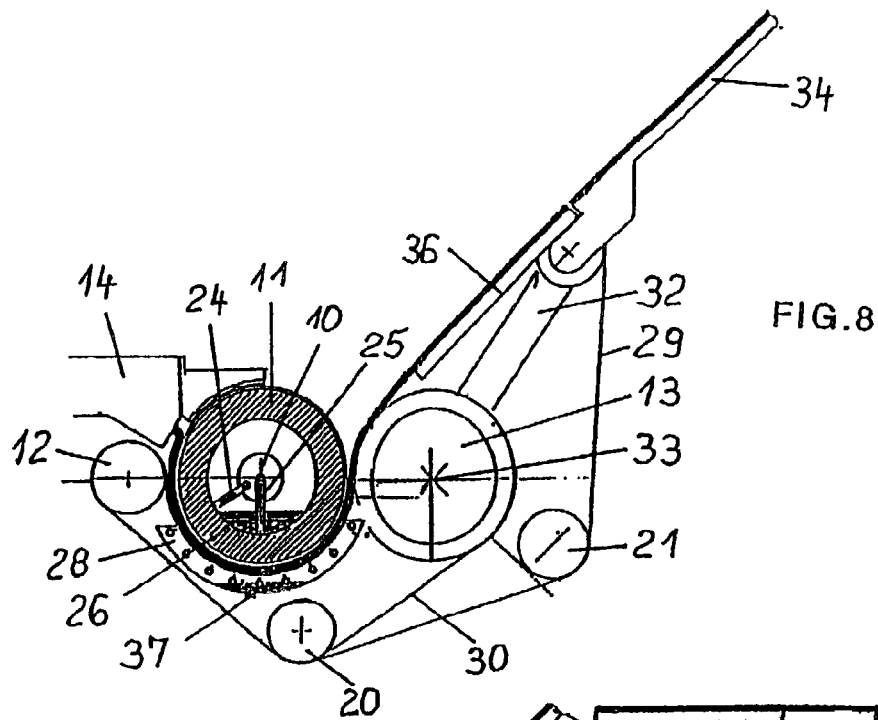
Figure 9:
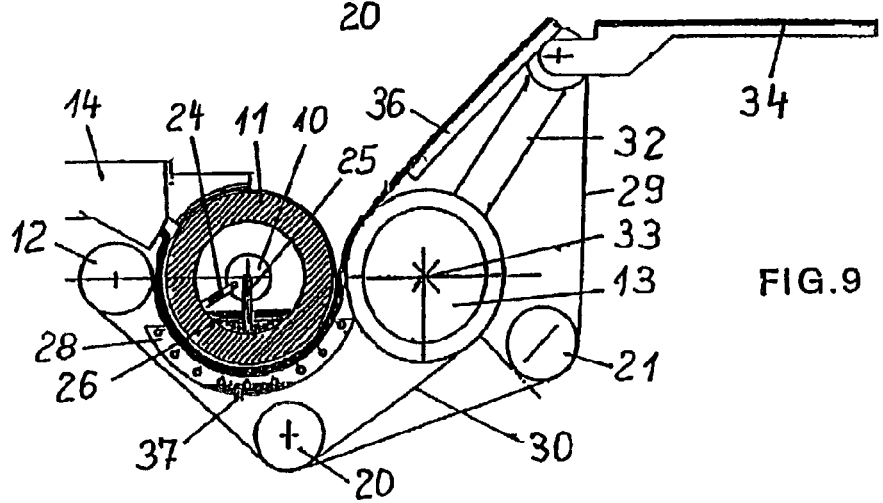
Figure 10:
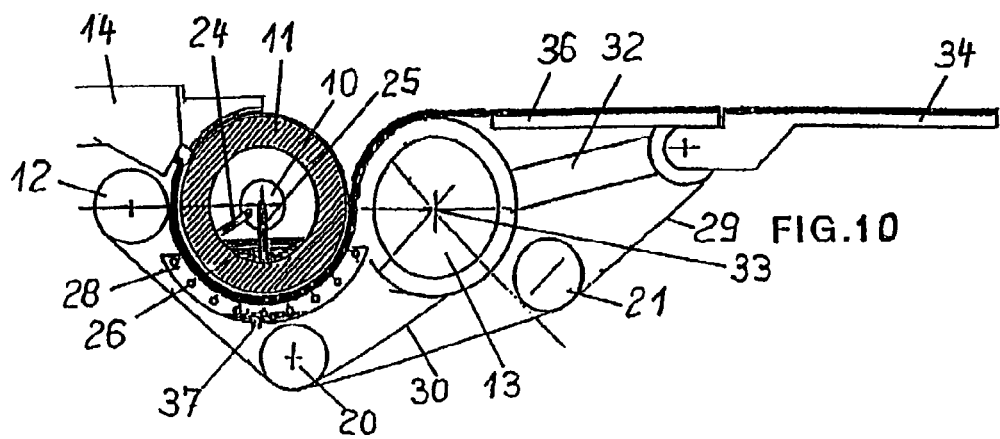
Figure 11:
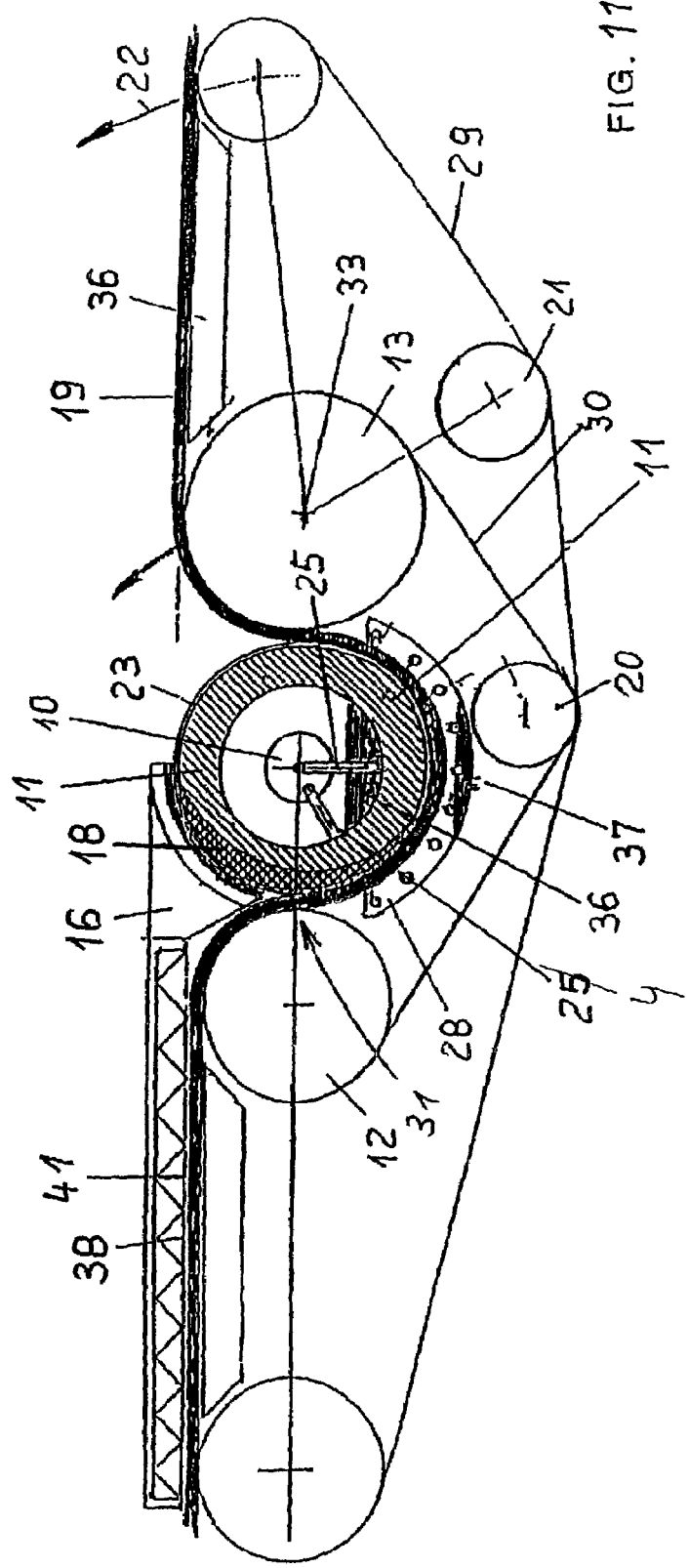
Figure 12:
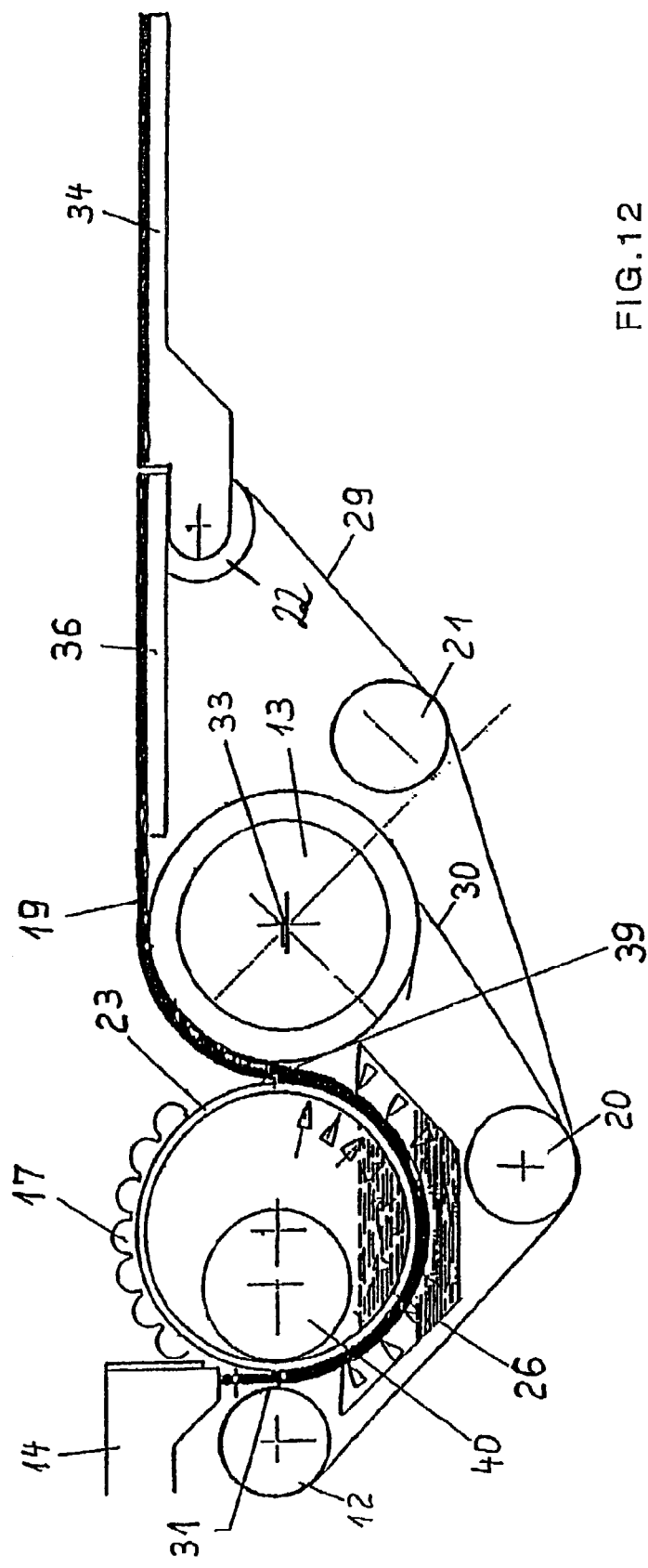

It is shown in:

FIG. 1 an enlarged profiled section of a deflecting prism disc with complete imprint of the prism edges of printing mold;

FIG. 2 an enlarged profiled section of a deflecting prism disc with complete imprint of the prism edges;

FIG. 3 an enlarge profiled section of a deflecting prism disc with a complete imprint of the prism edges of the printing mold;

FIG. 4 an enlarged photo of a linear deflecting prism disc produced by the pressing method;

FIG. 5 a schematic drawing of an embodiment of the device according to the invention for continuously producing endless films, webs, and sheets capable of forming optical images;

FIGS. 6 to 10 schematic drawings of embodiments of the device according to the invention according to FIG. 5 in different functional positions;

FIG. 11 a schematic drawing of a second embodiment of the device according to the invention;

FIG. 12 a schematic drawing of a third embodiment of the device according to the invention.

The optical quality of circular as well as linear Fresnel lenses of all geometries, including circular and linear prism plates made of PMMA and other plastic materials, is determined decisively by the sharpness of the top edge 4 of the prism which, in contrast to the bottom edge 5 of the prism, can be formed only with special measures by the shaping mold 1. In the case of a planar Fresnel lens, this mold is a flat mold 1.

The most effective such measure is the heating of the plastic material between the flat mold 1 and the smooth plate 2 to the melting temperature of the plastic material by applying a pressing force of at least 20 kN/cm$^2$. For removing the prism disc 3 from the press, the pressing package, comprised of mold, prism disc 3, and smooth plate 2, must be cooled by maintaining the pressing force up to the solidification temperature of the prism disc. When neglecting this measure, retractions of the top edges, in the form of rounded portions 9 and formation of hollow spaces 8 in the mold, result by the interruption of the after-pressure, which after-pressure is also required in the injection molding process for preventing depressions. When opening the pressing package before complete solidification of the prism disc 3 not only the rounded portions 9 of the top edges 4 of the prisms result but also unevenness of the prism flanks 6 and 7.

The prism disc which has such defects is practically not useable while high-quality prism sheets produced by the pressing method will find use only in limited areas as a result of their high manufacturing costs.

With the method and the device according to the invention for performing the same an economical production of films, webs, and sheets made of plastic material and capable of forming optical images is to be achieved. FIGS. 5 through 10 show an embodiment of the device according to the invention in different functional positions corresponding to the strength (thickness) of the films, webs or sheets to be manufactured. The enlarging schematic drawing FIG. 5 serves particularly for characterizing the method steps according to the invention. The mass and the wall thickness of the cylinder roller 11 as a function of the diameter thereof is decisive for an economic use of the method according to the invention, in which the melted plastic mass 41, exiting the extruder 14 via the wide slot nozzle 15, is applied onto the engraving on the engraving sleeve 23 which has been brought to the melting temperature. Preferably, the melted plastic mass 41 is here applied onto the cylinder roller 11 from the wide slot nozzle 15 at a minimum spacing of twice the slot height of the wide slot nozzle 15.

Heating members 17 of high output are installed shortly before the extrusion nozzle in the heating cover 16.

The relevant thermal process is to be explained with an exemplary provision of the following parameters. The aim is the endless manufacture of a PMMA product 19 with a strength (thickness) of 1 mm. A production output of 5 m/min is assumed. The diameter of the cylinder roller 11 is 1,000 mm. Corresponding to the circumference of the cylinder roller (3.14 m) it performs 1.5 revolutions/min. The melted plastic mass 41 surrounds, secured by the smoothing strip 29, a stretch of 1.85 m of the cylinder roller 11.

Accordingly, the temperature of the melted plastic mass, starting at the exit of the wide slot nozzle 15, is to be reduced from approximately 200° to 90° within a time period of 36 sec., and this is carried out according to the invention in that the temperature of the cylinder roller 11 is maintained at a value below 80° while the engraving sleeve 23 mounted onto the cylinder roller on a short stretch of the roller revolution is brought to approximately 200° by means of intensive radiation.

Accordingly, on the rotating cylinder roller 11 a heating zone 18 results which continuously fluctuates up and down.

By means of the cooling system according to the embodiment, a different cooling between the engraved surfaces and the surface resting against the smooth strip is to be achieved. The top edges 4 of the engraved prisms are to be solidified before the entire mass of the melted plastic material 41 has reached the solidification temperature.

This temperature difference has the result that, upon stretching of the products out of the bending angle about the cylinder roller into a straight line, respectively, into the opposite bending direction of the exit roller 13, a deformation risk for the engraved structure is eliminated or at least is reduced significantly.

The illustrated embodiment according to the invention of the cooling device has two cooling circuits.

This is, on the one hand, the cooling water supply line 24 and the cooling water removal line 25 through the roller axle 10. The water level of the cooling water 26 in the interior of the cylinder roller 11 can be controlled as well as the throughput.

The second controlled cooling circuit concerns the outer cooling wherein cooling water nozzles 27 are directed against the outer side of the smoothing strip 29 whose water is received in a tank 28.

It is apparent that on relevant positions of thermal parameters temperature measuring locations are to be provided.

At the intake of the melted mass 41 into the roller gap 31 a metered bead formation thereof can be advantageous, for which purpose, however, a size control, controlled by the bead itself, is required by changing the extrusion output or the revolution speed of the cylinder roller 11.

The efficiency of the method according to the invention to an optimal height is achieved by the device according to the invention in that a measurement of the temperature of the product strip 19 at the exit gap 39 controls the rotary speed of the cylinder roller 11.

A thermodynamic proof in regard to the course of the function of the inventive method would surpass the context of the patent application, and will therefore be supported by practical evidence, if needed.

In the device according to the invention the surrounding angle of the solidifying melted mass can be enlarged by displacing the axis of rotation of the exit roller 13 in the direction of arrow C.

The smoothing strip 29, which is ultra-finished on the inner side surrounds a portion of the circumference of the cylinder roller 11 and then passes across the exit roller 13 to the deflection roller 22 and passes the strip guiding roller 21 and the tensioning roller 20 in order to return via the intake roller 12 to partially surrounding the cylinder roller 11.

Within the smoothing strip circulation a pressure strip 30 is also provided which for maintaining the pressing force of the melted mass onto the engraving sleeve 23 of the cylinder roller 11 has a greater tension than the smoothing strip 29 which is circulating wide.

The bending of the solidified melted mass about the exit roller 13 depends on the material and is possible only up to a certain product thickness.

With the device according to the invention, however, product thicknesses of at least up to 10 mm are to be produced for which a second bending after leaving the rounded portion of the cylinder roller is no longer possible without damaging the prism structure.

According to the invention it is provided in this case that the cooling table 36 is moved into the vertical position (FIG. 6) by being rotated about the pivot point 33 of the exit roller 13. The product 19 then climbs up to the level of the support table 34 and is then separated by an entrained saw 35 from the trailing material. Without interruption of the production process, the support table with the product section is then moved into the horizontal position (FIG. 7) and stored. The support table is then moved back into the vertical position and receives the following product again in provided holders.

In accordance with the strength and bending properties (regenerating properties) of the product, the device according to the invention, i.e., the angled position of the exit table and the support table, is aligned for which purpose the axle of the deflection roller 22 is connected rotatably to the pivot point 33 by means of a pivot arm 32.

The method according to the invention and the device for performing the same can be applied also for manufacturing endless films, webs and sheets capable of forming optical images of pre-manufactured semi-finished material, in that according to FIG. 11 the semi-finished material is converted under a melting cover 38 into a melted plastic mass 41 and introduced into the roller gap 31 where it is subjected to the same treatment as the melted plastic mass of a wide slot nozzle 15 of the extruder 14.

The third embodiment according to FIG. 12 of the device according to the invention for performing the method for manufacturing the product according to the invention differs from the embodiments according to FIGS. 5 to 11 only in the area of the measures for optimal temperature control in the process of shaping films, webs, and sheets capable of forming optical images in the way that the engraving sleeve 23, without supporting cylinder roller, can receive the pressure on the roller gap 31 with one or several support rollers 40, according to their reduced mass can receive and release the respective melting heat with economically beneficial time parameters. While the engraving sleeve in the first embodiment of the invention for performing the method requires only a reduced wall thickness, in the third embodiment the use of thin-walled steel cylinders with a copper layer applied by electroplating is suggested into which the engraving for forming the products 19 capable of optical image forming is introduced.

LIST OF REFERENCE NUMERALS 1 flat mold
2 smooth plate
3 prism disc
4 top edge
5 bottom edge 6 prism flank (reflecting)
7 prism flank (neutral)
8 hollow space
9 rounded portion
10 roller axle
11 cylinder roller
12 intake roller
13 exit roller
14 extruder
15 wide slot nozzle
16 heating cover
17 heating member
18 heating zone
19 product
20 tensioning roller
21 strip guiding roller
22 deflection roller
23 engraving sleeve
24 cooling water supply line
25 cooling water removal line
26 cooling water
27 cooling water nozzle
28 tank
29 smoothing strip
30 pressure strip
31 roller gap
32 pivot arm
33 pivot point
34 support table
35 saw
36 cooling table
37 cooling water discharge
38 melting cover
39 exit gap
40 support roller
41 melted plastic mass

What is claimed is:

1. A method for continuously manufacturing films, webs, and sheets of plastics capable of forming optical images, the method comprising the steps of:
guiding a melted plastic mass (41), pre-shaped as a sheet, into a roller gap (31) of a calender, the roller gap (31) formed between a shaping engraving cylinder roller (11) and a smoothing strip (29) surrounding partially circumferentially the shaping engraving cylinder roller (11), wherein the roller gap extends circumferentially partially about the engraving cylinder roller;
heating the shaping engraving surface of the cylinder roller (11) to melting temperature at an intake of the roller gap (31), wherein the melted plastic mass (41) is applied directly onto the shaping engraving surface of the heated cylinder roller (11);
providing a profiling by cooling the melted plastic mass (41) in the roller gap (31) downstream of the intake by heat removal on a side of the melted plastic mass (41) facing the shaping engraving surface;
wherein in the step of providing a profiling the heat removal is carried out in a controlled fashion along the path of the melted plastic mass (41) about the cylinder roller (11) such that on the side of the solidifying melted plastic mass facing the shaping engraving surface more heat is removed than on the smooth side facing the smoothing strip (29) and the melted plastic mass is hardened in top edges (4) of prisms of the profiling before the material strip exits from an exit gap (39) of the calender as a finished product (19); and
wherein the melting temperature is present not within the entire rotating mass of the cylinder roller (11) but only within a stationary heating zone (18) of the cylinder roller (11), the method further comprising the step of preventing an increase of the heat in the cylinder roller mass by providing a cooling device (24, 25, 26; 27, 28) inside the cylinder roller or external to the cylinder roller at a location where the smoothing strip (29) surrounds partially circumferentially the cylinder roller and passing the melted plastic mass (41) through the cooling device temporally after the introduction into the intake of the roller gap (31).

2. The method according to claim 1, wherein the melted plastic mass solidified to the finished product (19) is moved in a stretched position or in an oppositely bent direction, as a function of the thickness and the mechanical properties of the finished product, to storage or further processing after leaving the exit gap (39).

3. The method according to claim 1, further comprising the step of cutting the finished product (19) exiting from the calender to length by a transverse movement of a saw (35) matched to the moving speed of the product (19).

4. The method according to claim 1, further comprising the steps of preparing the melted plastic mass (41), which is pre-shaped as a sheet, in an extruder (14) and transferring the melted plastic mass (41) from the extruder via a wide slot nozzle (15) directly onto the cylinder roller (11).

5. The method according to claim 1, further comprising the steps of preparing the melted plastic mass (41), which is pre-shaped as a sheet, from a semi-finished plastic product by melting the semi-finished plastic product under a melting cover (38) and subsequently directly transferring the melted plastic mass (41) onto the cylinder roller (11).

6. A device for performing a method for continuously manufacturing films, webs, and sheets of plastics capable of forming optical images, wherein a melted plastic mass (41), pre-shaped as a sheet, is guided into a roller gap (31) of a calender, the roller gap (31) formed between a shaping engraving cylinder roller (11) and a smoothing strip (29) surrounding circumferentially partially the shaping engraving cylinder roller (11) wherein the roller gap extends circumferentially partially about the engraving cylinder roller; wherein the shaping engraving surface of the cylinder roller (11) is heated to melting temperature at an intake of the roller gap (31), wherein the melted plastic mass (41) is applied directly onto the shaping engraving surface of the heated cylinder roller (11); and wherein a profiling by cooling the melted plastic mass (41) in the roller gap (31) downstream of the intake is provided by heat removal on a side of the melted plastic material (41) facing the shaping engraving surface; the device comprising:
a cylinder roller (11) having an exterior engraving sleeve (23);
a smoothing strip (29) partially circumferentially surrounding the cylinder roller (11) to form the roller gap (31) extending circumferentially partially about the engraving cylinder roller;
a positionable extruder (14) having a wide slot nozzle (15), wherein an opening surface of the wide slot nozzle (15) is adjustable longitudinally parallel to the surface of the cylinder roller (11) or to the surface of the engraving sleeve (23) so as to be variable with respect to spacing;
an exit roller (13) having an axle;

a cooling table (36) connected by a pivot arm (32) to the axle of the exit roller (13), wherein the cooling table (36) can be moved by the pivot arm (32) into various angular positions;

an angularly adjustable support table (34) pivotably connected on the cooling table (36); and a deflection roller (22) with a bearing connected to the cooling table (36).

7. The device according to claim 6, comprising a heating device (16) arranged shortly before an opening slot of the wide slot nozzle.

8. The device according to claim 6, wherein the exit roller (13) has a diameter that is at least as large as a diameter of the cylinder roller (11), wherein an axis of rotation of the exit roller (13) is displaceable for changing a surrounding stretch of the smoothing strip (29).

9. The device according to claim 8, wherein a spacing of the exit roller (13) from a roller axle (10) of the cylinder roller (11) is changeable.

10. The device according to claim 6, wherein the cylinder roller (11) is comprised substantially only of an engraving sleeve (23) and a heatable support roller (40) arranged in the engraving sleeve (23) for receiving a gap pressure of the roller gap (31) and for a linear axis-parallel heating of the engraving sleeve (23) in the area of the roller gap (31).

11. A device for performing a method for continuously manufacturing films, webs, and sheets of plastics capable of forming optical images, wherein a melted plastic mass (41), pre-shaped as a sheet, is guided into a roller gap (31) of a calender, the roller gap (31) formed between a shaping engraving cylinder roller (11) and a smoothing strip (29) surrounding circumferentially partially the shaping engraving cylinder roller (11) wherein the roller gap extends circumferentially partially about the engraving cylinder roller; wherein the shaping engraving surface of the cylinder roller (11) is heated to melting temperature at an intake of in the roller gap (31), wherein the melted plastic mass (41) is applied directly onto the shaping engraving surface of the heated cylinder roller (11); and wherein a profiling by cooling the melted plastic mass (41) in the roller gap (31) downstream of the intake is provided by heat removal on a side of the melted plastic material (41) facing the shaping engraving surface; the device comprising:

a cylinder roller (11) having an exterior engraving sleeve (23);

a smoothing strip (29) partially circumferentially surrounding the cylinder roller (11) to form the roller gap (31) extending circumferentially partially about the engraving cylinder roller;

a positionable extruder (14) having a wide slot nozzle (15), wherein an opening surface of the wide slot nozzle (15) is adjustable longitudinally parallel to the surface of the cylinder roller (11) or to the surface of the engraving sleeve (23) so as to be variable with respect to spacing; and a cooling water supply line (24) and a cooling water removal line (25) arranged in a roller axle (10) of the cylinder roller (11), wherein the cooling water supply line (24) guided through the cylinder roller (11) is provided with a spray nozzle arrangement and wherein cooling water (26) sprayed by the spray nozzle arrangement is collected in the interior of the cylinder roller (11) to a controlled level and is removed by a suction pipe of the cooling water removal line (25).

12. A device for performing a method for continuously manufacturing films, webs, and sheets of plastics capable of forming optical images, wherein a melted plastic mass (41), pre-shaped as a sheet, is guided into a roller gap (31) of a calender, the roller gap (31) formed between a shaping engraving cylinder roller (11) and a smoothing strip (29) surrounding circumferentially partially the shaping engraving cylinder roller (11) wherein the roller gap extends circumferentially partially about the engraving cylinder roller wherein the shaping engraving surface of the cylinder roller (11) is heated to melting temperature at an intake of the roller cap (31), wherein the melted plastic mass (41) is applied directly onto the shaping engraving surface of the heated cylinder roller (11); and wherein a profiling by cooling the melted plastic mass (41) in the roller gap (31) downstream of the intake is provided by heat removal on a side of the melted plastic material (41) facing the shaping engraving surface; the device comprising:

a cylinder roller (11) having an exterior engraving sleeve (23);

a smoothing strip (29) partially circumferentially surrounding the cylinder roller (11) to form the roller gap (31) extending circumferentially partially about the engraving cylinder roller;

a positionable extruder (14) having a wide slot nozzle (15), wherein an opening surface of the wide slot nozzle (15) is adjustable longitudinally parallel to the surface of the cylinder roller (11) or to the surface of the engraving sleeve (23) so as to be variable with respect to spacing; and wherein the smoothing strip (29) is an endless strip and wherein the device further comprises a strip guiding roller (21) and a deflection roller (22) for guiding the smoothing strip (29), wherein the smoothing strip (29) is tensioned by a spring-supported or hydraulically supported movement of the strip guiding roller (21) and does not exert own pressure onto the surrounded surface of the cylinder roller (11), wherein the device further comprises a pressure strip (30), not touching the deflection roller (22) and circulating inside of the smoothing strip (29) about a tensioning roller (20), wherein a tension of the pressure strip (30) is generated by a spring-supported or hydraulically supported movement of the tensioning roller (20).

13. The device according to claim 12, further comprising cooling water nozzles (27) positioned at the surrounding stretch of the smoothing strip (29) and the pressure strip (30) about the cylinder roller (11), wherein the smoothing strip (29) and the pressure strip (30) are steel strips, wherein the cooling water nozzles (27) cool the steel strips by spraying cooling water on the steel strips and wherein cooling water sprayed by the cooling water nozzles (27) is collected in a cooling water tank (28) and removed by a cooling water discharge (37).

* * * * *